United States Patent
Zhang et al.

(10) Patent No.: US 12,315,422 B2
(45) Date of Patent: May 27, 2025

(54) DRIVING METHOD FOR DISPLAY PANEL, DISPLAY PANEL, AND DISPLAY APPARATUS

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Mengmeng Zhang, Wuhan (CN); Jian Kuang, Wuhan (CN); Chenguang Sun, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/649,038

(22) Filed: Apr. 29, 2024

(65) Prior Publication Data
US 2024/0282237 A1     Aug. 22, 2024

(30) Foreign Application Priority Data

Jun. 28, 2023  (CN) .......................... 202310784087.5

(51) Int. Cl.
G09G 3/20     (2006.01)
(52) U.S. Cl.
CPC ....... *G09G 3/2092* (2013.01); *G09G 2310/08* (2013.01); *G09G 2320/0233* (2013.01); *G09G 2320/0247* (2013.01); *G09G 2320/064* (2013.01)
(58) Field of Classification Search
None
See application file for complete search history.

(56) References Cited

U.S. PATENT DOCUMENTS

2022/0319429 A1* 10/2022 Li .......... G09G 3/3233
2024/0161671 A1*  5/2024 Sun ........ G09G 3/3291

FOREIGN PATENT DOCUMENTS

CN       111696476 A     9/2020
CN       110853578 B     9/2021

* cited by examiner

*Primary Examiner* — Christopher J Kohlman
(74) *Attorney, Agent, or Firm* — Christensen O'Connor Johnson Kindness PLLC

(57) ABSTRACT

The present disclosure relate to a driving method for a display panel, a display panel, and a display apparatus. The display panel includes a first mode, and a driving period in the first mode includes an active frame and a hold frame. The driving method includes: in the first mode, controlling a total light emission duration of a light emission control signal in two adjacent time units in the driving period to satisfy the following condition:

$$\left|\frac{N_i - N_{i+1}}{N_i}\right| < A,$$

where the time unit includes at least one light emission period, a first time unit at least partially overlaps with the active frame, $N_i$ denotes a total light emission duration of the light emission control signal in the i-th time unit, $N_{i+1}$ denotes a total light emission duration of the light emission control signal in the (i+1)-th time unit, i≥1, and A denotes a critical percentage threshold for brightness variation.

19 Claims, 5 Drawing Sheets

DRIVING METHOD FOR DISPLAY PANEL, DISPLAY PANEL, AND DISPLAY APPARATUS

CROSS REFERENCE

The present disclosure claims priority to Chinese Patent Application No. 202310784087.5, filed on Jun. 28, 2023 and titled "DRIVING METHOD FOR DISPLAY PANEL, DISPLAY PANEL, AND DISPLAY APPARATUS", the contents of which are incorporated herein by reference in its entirety.

TECHNICAL FIELD

The present disclosure relates to the field of display technologies, and in particular, to a driving method for a display panel, a display panel, and a display apparatus.

BACKGROUND

When a display panel is driven at low frequencies, in order to improve the flickering caused by transistor current leakage, it is a common practice to adjust a duty cycle of a light emission control signal in a hold frame to enhance panel brightness. However, based on the current adjustment method, fluctuations in brightness caused by changes in the duty cycle of the light emission control signal may actually aggravate the flickering, causing a counterproductive effect.

SUMMARY

In view of this, embodiments of the present disclosure provide a driving method for a display panel, a display panel, and a display apparatus, to optimize the adjustment for the light emission control signal and avoid aggravating the flickering.

According to one aspect, an embodiment of the present disclosure provides a driving method for a display panel. The display panel has a first mode, and a driving period in the first mode includes an active frame and a hold frame.

The driving method includes: in the first mode, controlling a total light emission duration of a light emission control signal in two adjacent time units in the driving period to satisfy the following condition:

$$\left|\frac{N_i - N_{i+1}}{N_i}\right| < A,$$

where the time unit includes at least one light emission period, a first time unit at least partially overlaps with the active frame, $N_i$ denotes a total light emission duration of the light emission control signal in the i-th time unit, $N_{i+1}$ denotes a total light emission duration of the light emission control signal in the (i+1)-th time unit, $i \geq 1$, and A is a critical percentage threshold for brightness variation.

According to another aspect, an embodiment of the present disclosure provides a display panel that is driven using the foregoing driving method.

According to still another aspect, an embodiment of the present disclosure provides a display apparatus, including the foregoing display panel.

BRIEF DESCRIPTION OF DRAWINGS

To describe the technical solutions in the embodiments of the present disclosure more clearly, the following briefly describes the accompanying drawings required to be used in the embodiments. Apparently, the accompanying drawings in the following description show merely some embodiments of the present disclosure, and a person of ordinary skill in the art may still derive other accompanying drawings from these accompanying drawings.

DESCRIPTION OF EMBODIMENTS

For the sake of a better understanding of the technical solutions of the present disclosure, the embodiments of the present disclosure are described in detail below with reference to the accompanying drawings.

It should be noted that the embodiments in the following descriptions are only some rather than all of the embodiments in the present disclosure. All other embodiments obtained by a person of ordinary skill in the art on the basis of the embodiments of the present disclosure shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

It should be understood that the term "and/or" in this specification merely describes associations between associated objects, and it indicates three types of relationships. For example, A and/or B may indicate that A exists alone, A and B coexist, or B exists alone. In addition, the character "/" in this specification generally indicates that the associated objects are in an "or" relationship.

When a display panel is driven at low frequencies, the panel brightness will continuously decrease due to the influence of a transistor leakage current. The brightness attenuation is particularly pronounced at ultra-low driving frequencies such as 5 Hz and 10 Hz.

Figure 1:
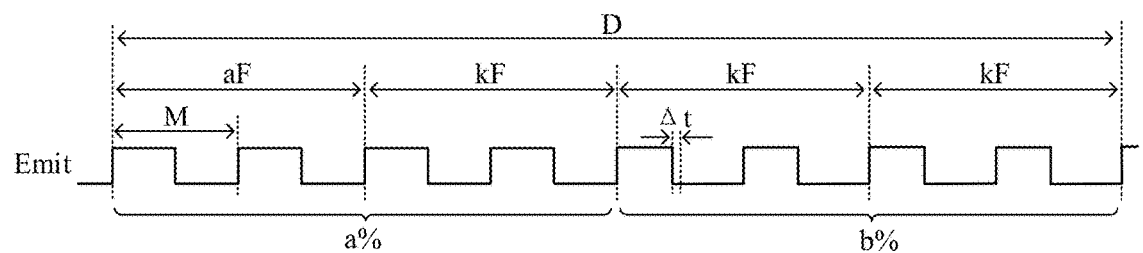
FIG. 1 is a timing diagram of a light emission control signal in the prior art.

Currently, the panel brightness is typically raised by adjusting the duty cycle of a light emission control signal in a hold frame. As shown in FIG. 1, which is a timing diagram of a light emission control signal Emit in the prior art, under low-frequency driving, a driving period D of the display panel includes an active frame aF and at least one hold frame kF. During the driving period D, a pixel circuit is provided with a light emission control signal Emit with a duty cycle of a % in the active frame aF to achieve target brightness of the display panel. When the panel brightness decreases to a brightness threshold, the duty cycle of the light emission control signal Emit can be adjusted from a % to b %, increasing a light emission duration of the light emission control signal Emit within a single light emission period M by Δt. That is, a pulse width of the active level (represented as a low level in the embodiments of the present disclosure) within a single light emission period M is increased by Δt. By utilizing the positive impact of the increased light emission duration on the panel brightness, the decreased brightness can be compensated, thereby raising the panel brightness to the vicinity of the target brightness.

However, during the research process, the inventor found that current display panels generally have multiple brightness levels. For example, in outdoor environments with high ambient light, a higher brightness level can be matched to make the overall brightness of the display screen higher. Conversely, in dimly lit indoor environments, a lower brightness level can be matched to make the overall brightness of the display screen lower. This allows users to clearly see the displayed content on the display panel in different application scenarios. At different brightness levels, the duty cycle of the light emission control signal Emit in the active frame aF varies. However, the above-mentioned design only adjusts the duty cycle of the light emission control signal Emit in a single manner, without considering the different impacts of the increased light emission duration within a single light emission period M on the panel brightness at different brightness levels after the light emission control signal Emit is adjusted.

Figure 2:
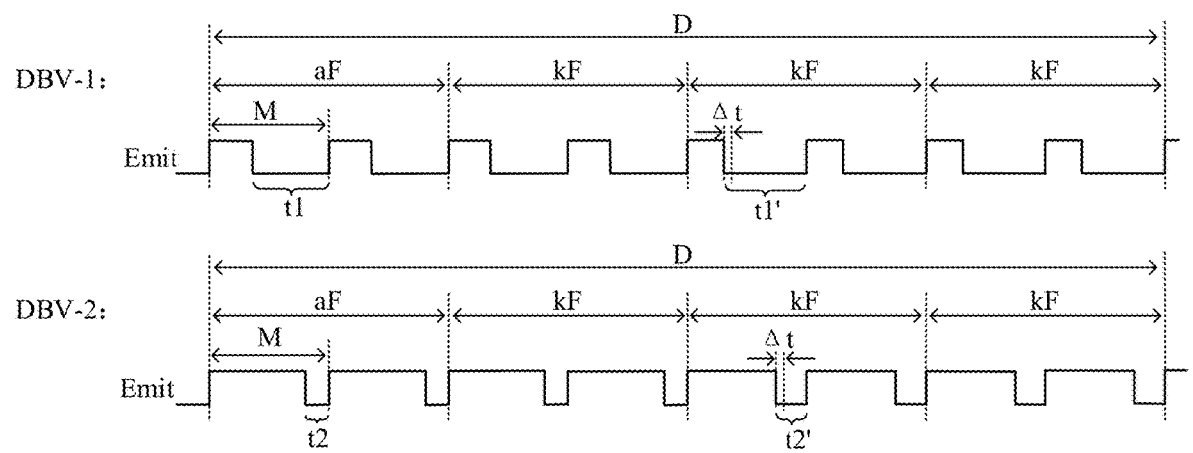
FIG. 2 is a timing diagram of a light emission control signal at different brightness levels in the prior art.
Figure 3:
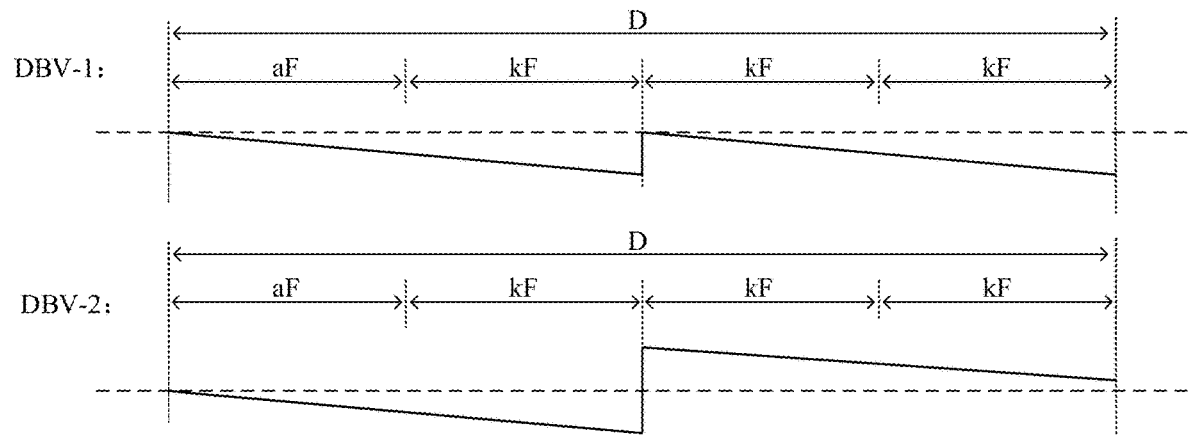
FIG. 3 is a schematic diagram of brightness fluctuations at different brightness levels in the prior art.

For example, as shown in FIG. 2 and FIG. 3, FIG. 2 is a timing diagram of a light emission control signal at different brightness levels in the prior art, and FIG. 3 is a schematic diagram of brightness fluctuations at different brightness levels in the prior art. The display panel as a first brightness level DBV-1 and a second brightness level DBV-2. Maximum brightness in the first brightness level DBV-1 is higher than maximum brightness in the second brightness level DBV-2. When the display panel is at a higher first brightness level DBV-1, the light emission control signal Emit has a longer light emission duration t1 within a single light emission period M in the active frame aF. After the duty cycle of the light emission control signal Emit is adjusted to increase the light emission duration within a single light emission period M by Δt, the resulting adjusted light emission duration t1' (t1+Δt) will not vary significantly compared to the original light emission duration t1. This small fluctuation in brightness caused by the adjustment of the light emission control signal Emit can effectively raise the panel brightness to the vicinity of the target brightness. However, when the display panel switches to a lower second brightness level DBV-2, a light emission duration t2 of the light emission control signal Emit within a single light emission period M in the active frame aF is already relatively small at the DBV-2 level. Therefore, after the duty cycle of the light emission control signal Emit is adjusted to increase the light emission duration within a single light emission period M by Δt, the resulting adjusted light emission duration t2' (t2+Δt) will vary significantly compared to the original light emission duration t2. This leads to a large fluctuation in brightness before and after the adjustment of the light emission control signal Emit, which obviously exceeds the target brightness and exacerbates the flickering phenomenon.

In particular, based on the current structure design of the emission shift register circuit, when the emission shift register circuit outputs the light emission control signal Emit, the light emission duration of the light emission control signal Emit within a single light emission period M is an integer multiple of the line time (H). The line time is one frame time divided by the quantity of pixel rows in the display panel. Furthermore, when an emission shift register circuit at one stage drives a pixel row, the variation in the light emission duration of the light emission control signal Emit within a single light emission period M, after the duty cycle of the light emission control signal Emit is adjusted, should be an integer multiple of 2H. In other words, the light emission duration should change by at least 2H. When a shift register circuit at one stage drives two pixel rows, the variation in the light emission duration of the light emission control signal Emit within a single light emission period M, after the duty cycle of the light emission control signal Emit is adjusted, should be an integer multiple of 4H. In other words, the light emission duration should change by at least 4H.

Taking a variation of 8H (Δt) in the light emission duration of the light emission control signal Emit within a single light emission period M as an example, it is assumed that in the first brightness level DBV-1, the light emission duration t1 of the light emission control signal Emit within a single light emission period M in the active frame aF is 400H. After the light emission duration changes by 8H, the brightness increases by 2% with a small fluctuation. However, when the brightness level decreases to the second brightness level DBV-2, the light emission duration t2 of the light emission control signal Emit within a single light emission period M in the active frame aF is only 40H. In other words, a variation of 8H in the light emission duration would result in a 20% increase in brightness, causing a significant fluctuation in brightness.

For example, for display products with fewer pixel rows, such as smartwatches, the individual line time is longer. After the duty cycle of the light emission duration is changed, the variation in the light emission duration of the light emission control signal Emit within a single light emission period M becomes larger. As a result, the flickering becomes even worse.

Figure 4:
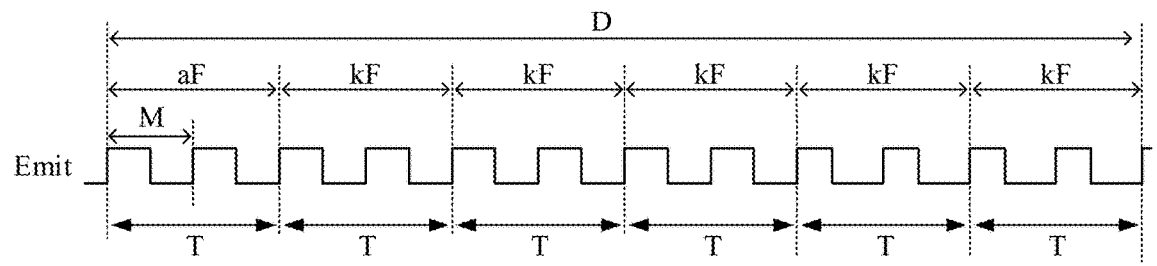
FIG. 4 is a timing diagram of a light emission control signal according to an embodiment of the present disclosure.
Figure 5:
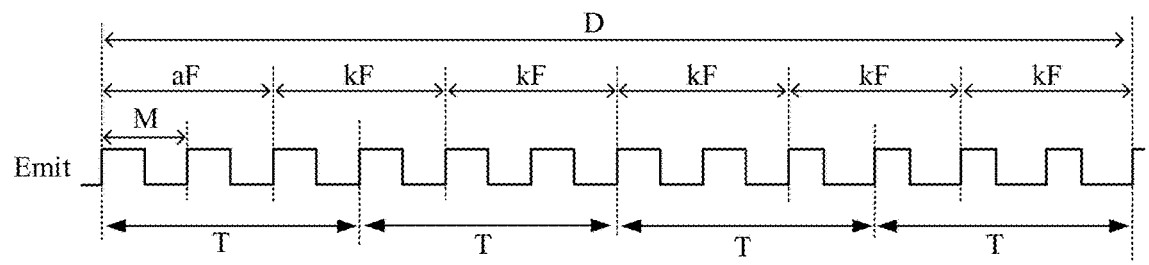
FIG. 5 is another timing diagram of a light emission control signal according to an embodiment of the present disclosure.

In view of this, an embodiment of the present disclosure provides a driving method for a display panel. As shown in FIG. 4 and FIG. 5, FIG. 4 is a timing diagram of a light emission control signal according to an embodiment of the present disclosure; and FIG. 5 is another timing diagram of a light emission control signal according to an embodiment of the present disclosure. The display panel has a first mode, and a driving period D in the first mode includes an active frame aF and a hold frame kF. The first mode may be a low-frequency driving mode, and a driving frequency of the display panel in the first mode may be 5 Hz, 10 Hz, 15 Hz, 20 Hz, 30 Hz, 45 Hz, 60 Hz or the like.

The driving method includes: in the first mode, controlling a total light emission duration of a light emission control signal Emit in two adjacent time units T in the driving period D satisfies the following condition:

$$\left| \frac{N_i - N_{i+1}}{N_i} \right| < A,$$

where the time unit T includes at least one light emission period M, a first time unit $T_1$ at least partially overlaps with the active frame aF, $N_i$ is a total light emission duration of the light emission control signal Emit in the i-th time unit $T_i$, and $N_{i+1}$ is a total light emission duration of the light emission control signal Emit in the (i+1)-th time unit $T_{i+1}$, i≥1, and A is a critical percentage threshold for brightness variation.

The light emission period M refers to a period of a single pulse in the light emission control signal Emit. When the light emission control signal Emit includes one light emission period M, a total light emission duration of the light emission control signal Emit within a time unit T is equal to a light emission duration of the light emission control signal Emit within the single light emission period M. When the light emission control signal Emit includes at least two emission cycles M, a total light emission duration of the light emission control signal Emit within a time unit T is a sum of light emission durations of the light emission control signal Emit within the at least two light emission periods M. The light emission duration of the light emission control signal Emit within the light emission period M corresponds to a pulse width of the active level in the pulse of the light emission control signal Emit.

The critical percentage threshold A for brightness variation refers to the percentage threshold for the critical change in brightness that the human eye can perceive as flickering. For example, when the percentage change in brightness between the increased brightness and the original brightness reaches the threshold A, the fluctuation in brightness becomes noticeable to the human eye.

In the embodiments of the present disclosure, during configuration of the time units T, the first time unit T at least partially overlaps with the active frame aF. This means that the total light emission duration $N_1$ of the light emission control signal Emit within the first time unit T will cover the light emission duration of the light emission control signal Emit in a single light emission period M within the active frame aF. Therefore, when the total light emission duration of the light emission control signal Emit in any two adjacent time units T satisfies the condition $$\left|\frac{N_i - N_{i+1}}{N_i}\right| < A,$$

it can be considered that the adjustment on the total light emission duration of the light emission control signal Emit in subsequent time units T is based on the light emission duration of the light emission control signal Emit in a single light emission period M within the active frame aF. As described above, due to the different light emission durations of the light emission control signal Emit within a single light emission period M of the active frame aF at different brightness levels, embodiments of the present disclosure allow for targeted adjustments of the light emission control signal Emit based on the current brightness level of the display panel. By further controlling the fluctuation amplitude of the light emission control signal Emit in any two adjacent time units to be less than the critical percentage threshold A for brightness variation, which is the threshold at which flickering becomes perceptible to the human eye, the brightness of the adjacent time units can be gradually and slightly increased in a smooth manner. This helps to avoid noticeable fluctuations in brightness caused by changes in the light emission control signal Emit.

Therefore, the driving method provided by the embodiments of the present disclosure can help avoid exacerbating flickering at different brightness levels when attempts are made to mitigate the flickering.

It should be noted that, in the embodiments of the present disclosure, it is possible to start adjusting the light emission control signal Emit when the panel brightness attenuates to a brightness threshold. In other words, in the embodiments of the present disclosure, the adjustment of the duty cycle of the light emission control signal Emit does not necessarily begin within the second time unit $T_2$. The light emission control signal Emit can remain unchanged in the first few time units T and the adjustment is started in a later time unit T. However, it can be understood that if no adjustment is made to the light emission control signal Emit in the first few time units T, the difference in the total light emission duration of the light emission control signal Emit between adjacent time units T among these time units will be 0, resulting in 0 brightness fluctuation. Therefore, the foregoing condition $$\left|\frac{N_i - N_{i+1}}{N_i}\right| < A$$

is also satisfied. Alternatively, in the embodiments of the present disclosure, it is also possible to start adjusting the light emission control signal Emit within the second time unit $T_2$, which is not specifically limited in the present disclosure.

Furthermore, it should be noted that the quantity of hold frames kF included in the driving period D, the quantity of time units T included in the driving period D, and a quantity of light emission periods M included in the time unit T, as depicted in the accompanying drawings of the embodiments of the present disclosure, are for illustrative purposes only and do not represent specific limitations on these quantities.

In one feasible implementation, referring to FIG. 4 and FIG. 5 again, the time unit T includes at least two light emission periods M.

As described above, when an emission shift register circuit at one stage drives one pixel row, the variation in the light emission duration of the light emission control signal Emit within a single light emission period M, after the light emission control signal Emit is adjusted, should be at least 2H. When a shift register circuit at one stage drives two pixel rows, the variation in the light emission duration of the light emission control signal Emit within a single light emission period M, after the light emission control signal Emit is adjusted, should be at least 4H.

For lower brightness levels, the light emission duration of the light emission control signal Emit within a single light emission period M in the active frame aF may be very short. Even if the light emission duration of the light emission control signal Emit within a single light emission period M changes by only 2H or 4H after the light emission control signal Emit is adjusted, the total light emission duration of the light emission control signal Emit within two adjacent time units T in the driving period D may still fail to satisfy $$\left|\frac{N_i - N_{i+1}}{N_i}\right| < A.$$

Taking the minimum variation in the light emission duration of the light emission control signal Emit within a single light emission period M being 4H as an example, it is assumed that A=3%, and at a certain brightness level, the light emission duration of the light emission control signal Emit within a single light emission period M of the active frame aF is 100H. If the time unit T includes only one light emission period M, even if the light emission duration of the light emission control signal Emit in the subsequent light emission period M changes by only 4H after the duty cycle of the light emission control signal Emit is adjusted, the fluctuation in brightness between the two time units T will reach 4%, which does not satisfy the condition of being less than 3%. However, if the time unit T is set to include two light emission periods M, the fluctuation in brightness between the two adjacent time units T can be controlled to be within 2% by controlling the light emission duration of the light emission control signal within one light emission period M to change by 4H in the subsequent time unit T while keeping the light emission duration within the other light emission period M unchanged. In this way, the fluctuation is less than 3%.

Therefore, in the embodiments of the present disclosure, by setting the time unit T to include at least two light emission periods M, the adjustment of the light emission control signal Emit can meet the foregoing condition across a wider range of brightness levels, and the adjustment of the light emission control signal Emit can be implemented using different approaches.

Figure 6:
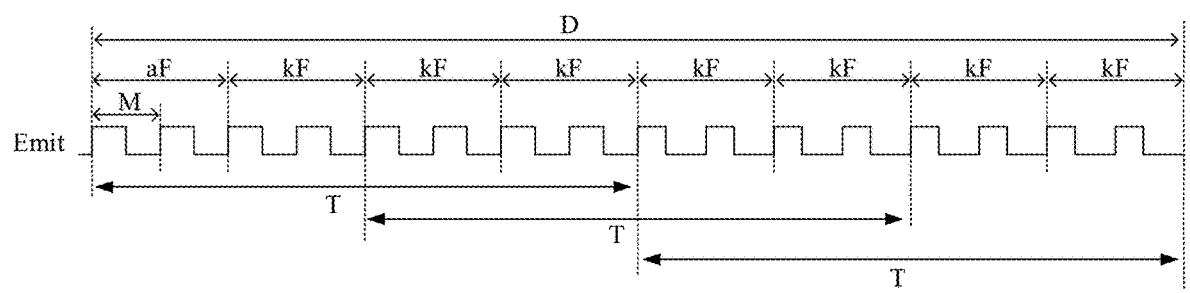
FIG. 6 is still another timing diagram of a light emission control signal according to an embodiment of the present disclosure.

When the time unit T includes at least two light emission periods M, in one feasible implementation, as shown in FIG. 6, which is still another timing diagram of a light emission control signal Emit according to an embodiment of the present disclosure, there is at least one overlapping light emission period M between two adjacent time units T.

Referring to FIG. 6, in an example, the time unit T includes four light emission periods M, with two overlapping light emission periods M between two adjacent time units T. In this configuration manner, after the total light emission duration $N_i$ of the light emission control signal Emit during the i-th time unit $T_i$ (from the x-th to the (x+3)-th light emission period M) is designed, the light emission durations of the light emission control signal Emit within the (x+4)-th light emission period M and the (x+5)-th light emission period M are adjusted to ensure that the total light emission duration $N_{i+1}$ of the light emission control signal Emit during the (i+1)-th time unit $T_{i+1}$ (from the (x+2)-th to the (x+5)-th light emission period M) satisfies the following condition:

$$\left|\frac{N_i - N_{i+1}}{N_i}\right| < A.$$

In this design approach, two adjacent time units T overlap with each other, allowing for finer control over the brightness fluctuations throughout the entire driving period D. Additionally, this design is more suitable for cases where the frequency is slightly higher and the entire driving period D includes fewer light emission periods M.

Furthermore, referring FIG. 6 again, numbers of overlapping light emission periods M between any two adjacent time units T are equal. This simplifies the design of the time unit T and makes the design more regular. Moreover, the overlapping situation between any two adjacent time units T remains consistent, resulting in more uniform control over the overall brightness.

Figure 7:
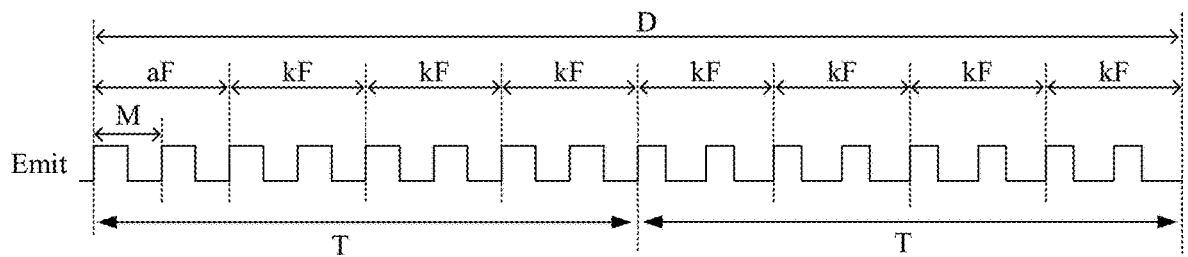
FIG. 7 is further another timing diagram of a light emission control signal according to an embodiment of the present disclosure.

When the time unit T includes at least two light emission periods M, in another feasible implementation, as shown in FIG. 7, which is further another timing diagram of a light emission control signal Emit according to an embodiment of the present disclosure, two adjacent time units T are continuous but do not overlap with each other.

Referring to FIG. 7, in this example, the time unit T still includes four light emission periods M. In this configuration manner, after the total light emission duration $N_i$ of the light emission control signal Emit during the i-th time unit $T_i$ (from the x-th to the (x+3)-th light emission period M) is designed, the light emission durations of the light emission control signal Emit within the (x+4)-th, (x+5)-th, (x+6)-th, and (x+7)-th light emission periods M are adjusted to ensure that the total light emission duration $N_{i+1}$ of the light emission control signal Emit during the (i+1)-th time unit $T_{i+1}$ (from the (x+4)-th to the (x+7)-th light emission period M) satisfies the following condition:

$$\left|\frac{N_i - N_{i+1}}{N_i}\right| < A.$$

When the total light emission duration of the light emission control signal Emit within a time unit T is adjusted using this design, more light emission periods M can be adjusted. Therefore, it allows for a more precise and flexible control of the total light emission duration within the time unit T. For example, the light emission control signal Emit can have different total light emission durations by adjusting the light emission durations in 1, 2, 3, or 4 light emission periods M. Furthermore, this design is more suitable for cases where the frequency is slightly lower and the entire driving period D includes more light emission periods M.

In one feasible implementation, referring to FIG. 6 and FIG. 7 again, the time unit T is an integer multiple of one frame time. One frame time is a duration of one active frame aF (or one hold frame kF).

Since the active frame aF and hold frame kF within the driving period D are also divided based on one frame time, making the time unit T an integer multiple of one frame time allows for at least one complete active frame aF and/or at least one complete hold frame kF to be included within one time unit T. In this way, the time unit T can correspond to the complete active frame aF and hold frame kF, making the division of the time unit T more regular.

In one feasible implementation, the display panel has a first brightness level and a second brightness level, where maximum brightness at the second brightness level is lower than maximum brightness at the first brightness level. The value of A corresponding to the second brightness level is greater than the value of A corresponding to the first brightness level. For example, the value of A corresponding to the second brightness level is 3%, and the value of A corresponding to the first brightness level is 2%.

As mentioned earlier, different brightness levels correspond to different light emission durations of the light emission control signal Emit within the light emission period M in the active frame aF. The lower the brightness level, the shorter the light emission duration of the light emission control signal Emit within the light emission period M in the active frame aF. Therefore, compared to the first brightness level, when the display panel is at the second brightness level, the light emission control signal Emit has a shorter light emission duration within the light emission period of the active frame aF. If the value of A corresponding to the second brightness level is set to be very low, even if the light emission duration of the light emission control signal Emit within a single light emission period M changes by only 2H or 4H, the total light emission duration of the light emission control signal Emit in two adjacent time units T may fail to satisfy the foregoing condition.

For example, it is assumed that a time unit T includes one frame time (two light emission periods M) and an emission shift register circuit at one stage drives two pixel rows. At the second brightness level, the light emission duration of the light emission control signal Emit within a single light emission period M in an active frame aF (the first time unit $T_1$) is 200H. If the critical percentage threshold A corresponding to the second brightness level is designed to be 1%, even if the total light emission duration of the light emission control signal Emit within the entire second time unit $T_2$ changes by only 4H, the brightness fluctuation $$\left(\frac{4H}{400H} = 1\%\right)$$

between the second time unit $T_2$ and the first time unit $T_1$ cannot be less than 1%. To address this, the value of A corresponding to the second brightness level can be designed larger, providing more achievable options for controlling the light emission control signal Emit at the second brightness level.

In one feasible implementation, the first mode includes a first driving mode and a second driving mode. Driving frequency in the second driving mode is lower than a driving frequency in the first driving mode. For example, the driving frequency in the first driving mode is 30 Hz, and the driving frequency in the second driving mode is 15 Hz. The display panel has a third brightness level, where the value of A corresponding to the third brightness level in the second driving mode is less than the value of A corresponding to the third brightness level in the first driving mode.

Due to the lower tolerance of the human eye to brightness fluctuations at lower driving frequencies, for the same brightness level, the value of A corresponding to the second driving mode with a lower driving frequency can be designed smaller. This helps to minimize the brightness fluctuations caused by the adjustment of the light emission control signal Emit, making fluctuations less visible to the human eye.

Figure 8:
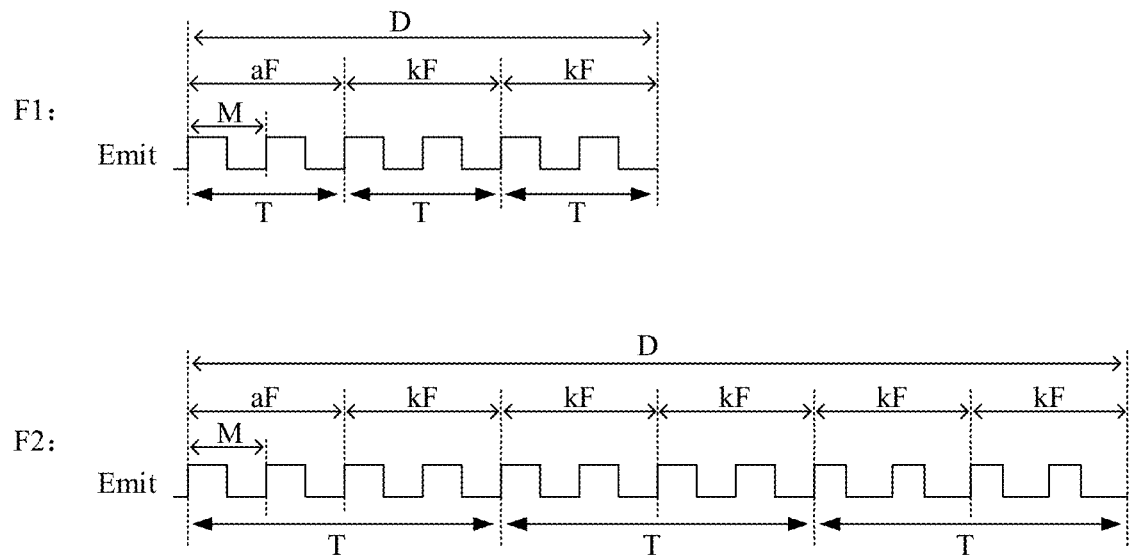
FIG. 8 is further another timing diagram of a light emission control signal according to an embodiment of the present disclosure.

In one feasible implementation, as shown in FIG. 8, which is further another timing diagram of a light emission control signal Emit according to an embodiment of the present disclosure. The first mode includes a first driving mode F1 and a second driving mode F2. A driving frequency in the second driving mode F2 is lower than a driving frequency in the first driving mode F1. For example, the driving frequency in the first driving mode F1 is 30 Hz, while the driving frequency in the second driving mode F2 is 15 Hz. A quantity of light emission periods M included in one time unit T in the second driving mode F2 is greater than a quantity of light emission periods M included in one time unit T in the first driving mode F1.

Compared to the first driving mode F1, the second driving mode F2 has a lower driving frequency, resulting in a longer driving period D. The driving period D includes more light emission periods M. Therefore, during configuration of the time unit T in the second driving mode F2, the time unit T can be designed to include a larger quantity of light emission periods M. Moreover, with a larger quantity of light emission periods M included in a time unit T, there are more options for adjusting the light emission durations within the light emission periods M. For example, it is possible to adjust the light emission durations in 1, 2, 3, 4, or even more light emission periods M to achieve different total light emission durations of the light emission control signal Emit within a time unit T. This provides more flexibility and precision in controlling brightness fluctuations.

In one feasible implementation, the driving method further includes: in the first mode, determining whether a current brightness level is greater than a first threshold brightness level and less than a second threshold brightness level, and if so, controlling a total light emission duration of the light emission control signal Emit within two adjacent time units T in the driving period D to satisfy the following condition:

$$\left|\frac{N_i - N_{i+1}}{N_i}\right| < A.$$

Maximum brightness at the first threshold brightness level is $$L_{max} \times \left(\frac{32}{255}\right)^\gamma,$$

and maximum brightness at the second threshold brightness level is $$L_{max} \times \left(\frac{220}{255}\right)^\gamma.$$

$L_{max}$ represents maximum brightness at a maximum brightness level of the display panel, and $\gamma$ is a gamma value, for example, $\gamma$ can be 2.2.

When the brightness level is too low or too high, a displayed image on the display panel will have very low or very high brightness, making it less noticeable when brightness fluctuations occur. Therefore, in the embodiments of the present disclosure, the light emission control signal Emit can be adjusted only at other brightness levels between the first threshold brightness level and the second threshold brightness level. This reduces the quantity of brightness levels that need to be controlled and lowers the design complexity.

In one feasible implementation, the quantity of light emission periods M included within a time unit T is k. The light emission duration of the light emission control signal Emit within a single light emission period M in the active frame aF is t1. When there is a change in the duty cycle of the light emission control signal Emit, the minimum variation in the light emission duration of the light emission control signal Emit within a single light emission period M is Δt, where $$\frac{\Delta t}{t1} < A,$$

and k≥1.

When the shift register circuit at one stage drives one pixel row, the minimum variation in the light emission duration of the light emission control signal Emit within a single light emission period M is 2H, and in this case, Δt is equal to 2H. When the shift register circuit at one stage drives two pixel rows, the minimum variation in the light emission duration of the light emission control signal Emit within a single light emission period M is 4H, and in this case, Δt is equal to 4H.

When the light emission duration t1 of the light emission control signal Emit within a single light emission period M in the active frame aF is greater than Δt/A, it indicates that even if one time unit T includes only one light emission period M, it is possible to satisfy the condition $$\frac{\Delta t}{t1} < A$$

by controlling the light emission duration of the light emission control signal Emit within the light emission period M of the next time unit T to change by Δt. That is, there is a feasible adjustment scheme when the time unit T includes only one light emission period M. Therefore, in this case, the quantity of light emission periods M included within a time unit T can be 1, 2, 3, or any other value.

For example, it is assumed that A=3%. When the shift register circuit at one stage drives one pixel row, if the light emission duration of the light emission control signal Emit within a single light emission period M in the active frame aF is greater than $$67H\left(\frac{2H}{3\%}\right),$$

assuming it to be 100H, even if a time unit T includes only one light emission period M, by controlling the light emission duration of the light emission control signal Emit within the light emission period M of the next time unit T to change by 2H, it is still possible to satisfy the condition $$\frac{2H}{100H} < 3\%.$$

In this case, the time unit T can include 1, 2, 3, or any other quantity of light emission periods M. When the shift register circuit at one stage drives two pixel rows, if the light emission duration of the light emission control signal Emit within a single light emission period M in the active frame aF is greater than $$133H\left(\frac{4H}{3\%}\right),$$

assuming it to be 200H, even if a time unit T includes only one light emission period M, by controlling the light emission duration of the light emission control signal Emit within the light emission period M of the next time unit T to change by 4H, it is still possible to satisfy the condition $$\frac{4H}{200H} < 3\%.$$

In this case, the time unit T can include 1, 2, 3, or any other quantity of light emission periods M.

In one feasible implementation, the quantity of light emission periods M included within a time unit T is k. The light emission duration of the light emission control signal Emit within a single light emission period M in the active frame aF is t1. When there is a change in the duty cycle of the light emission control signal Emit, the minimum variation in the light emission duration of the light emission control signal Emit within a single light emission period M is Δt, where $$\frac{\Delta t}{t1} > A, \text{ and } k > \frac{\Delta t}{A \times t1},$$

that is, k is greater than 1.

As mentioned earlier, Δt can be 2H or 4H. When the light emission duration t1 of the light emission control signal Emit within a single light emission period M in the active frame aF is less than Δt/A, it indicates that when one time unit T includes only one light emission period M, even if the light emission duration of the light emission control signal Emit within the light emission period M of the next time unit T changes by Δt, it is still impossible to satisfy the condition $$\frac{\Delta t}{t1} < A.$$

That is, there is no feasible adjustment scheme when the time unit T includes only one light emission period M. In this case, the time unit T cannot include only one light emission period M, and the quantity of light emission periods M should be two or more.

For example, it is assumed that A=3%. When an emission shift register circuit at one stage drives one pixel row and the light emission duration t1 of the light emission control signal Emit within a single light emission period M in the active frame aF is less than $$67H\left(\frac{2H}{3\%}\right),$$

assuming it to be 50H, if one time unit T includes only one light emission period M, even if the light emission duration of the light emission control signal Emit within the light emission period M in the next time unit T is controlled to change by only $$2H, \frac{2H}{50H}$$

is still less than 3%. In this case, the time unit T cannot include only one light emission period M, but needs to include two or more light emission periods M. When the emission shift register circuit at one stage drives two pixel rows and the line time corresponding to the light emission duration t1 of the light emission control signal Emit within a single light emission period M in the active frame aF is less than $$133H\left(\frac{4H}{3\%}\right),$$

assuming it to be 100H, if one time unit T includes only one light emission period M, even if the light emission duration of the light emission control signal Emit within the light emission period M in the next time unit T is controlled to change by only 4H, it is still not possible to make 4H/100H less than 3%. In this case, the time unit T cannot include only one light emission period M, but needs to include two or more light emission periods M.

Further, $$\frac{\Delta t}{(k-1) \times t1} > A.$$

Based on the previous analysis, when the light emission duration t1 of the light emission control signal Emit within a single light emission period M in the active frame aF is less than Δt/A, the time unit T needs to include two or more light emission periods M. By further constraining $$\frac{\Delta t}{(k-1) \times t1} > A,$$

k can be set to a minimum value during value setting of k, to shorten the duration of the time unit T and achieve more precise control over the brightness fluctuations throughout the entire driving period D.

For example, it is assumed that A=3%. When a shift register circuit at one stage drives one pixel row, if the line time corresponding to the light emission duration t1 of the light emission control signal Emit within a single light emission period M in the active frame aF is less than $$67H \left(\frac{2H}{3\%}\right),$$

assuming it to be 20H, in order to satisfy the condition $$k > \frac{2H}{3\% \times 20H},$$

k can be set to values such as 4, 5, 6, and so on. Furthermore, to satisfy the condition $$\frac{2H}{(k-1) \times 20H} > 3\%,$$

k can be set to 4. Alternatively, if the line time is 50H, in order to satisfy the condition $$k > \frac{2H}{3\% \times 50H},$$

k can be set to values such as 2, 3, 4, and so on. Further, to satisfy the condition $$\frac{2H}{(k-1) \times 50H} > 3\%,$$

k can be set to 4. When the shift register circuit at one stage drives two pixel rows, if the line time corresponding to the light emission duration t1 of the light emission control signal Emit within a single light emission period M in the active frame aF is less than $$133H \left(\frac{2H}{3\%}\right),$$

assuming it to be 100H, in order to satisfy the condition $$1k > \frac{4H}{3\% \times 100H},$$

k can be set to values such as 2, 3, 4, and so on. Furthermore, to satisfy the condition $$\frac{4H}{(k-1) \times 100H} > 3\%,$$

k can be set to 2. Alternatively, if the line time is 50H, in order to satisfy the condition $$k > \frac{4H}{3\% \times 50H},$$

k can be set to values such as 3, 4, 5, and so on. Further, to satisfy the condition $$\frac{4H}{(k-1) \times 50H} > 3\%,$$

k can be set to 3.

Figure 9:
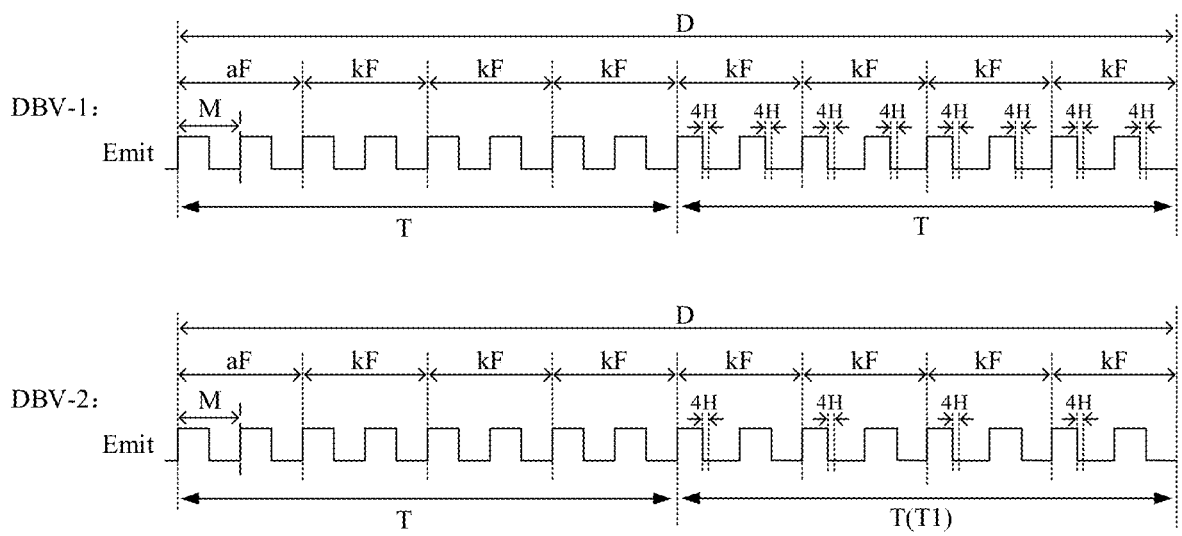
FIG. 9 is further another timing diagram of a light emission control signal according to an embodiment of the present disclosure.

In one feasible implementation, as shown FIG. 9, which is further another timing diagram of a light emission control signal according to an embodiment of the present disclosure, the display panel as a first brightness level DBV-1 and a second brightness level DBV-2. Maximum brightness in the first brightness level DBV-1 is higher than maximum brightness in the second brightness level DBV-2. At the second brightness level DBV-2, the time unit T includes a first time unit T1. The light emission control signal Emit has different light emission durations in at least some of the light emission periods M in the first time unit T1.

For example, at the first brightness level DBV-1, the light emission control signal Emit has a light emission duration of 200H and a non-emission duration of 40H within a single light emission period M in the active frame aF. At the second brightness level DBV-2, the light emission control signal Emit has a light emission duration of 100H and a non-emission duration of 140H within a single light emission period M in the active frame aF.

For example, the minimum variation in the light emission duration within a single light emission period M is 4H, A=3%, a time unit T includes four frame times, where each frame time includes two light emission periods M. At the first brightness level DBV-1, the light emission control signal Emit has a light emission duration of 200H and a non-emission duration of 40H within each light emission period M in the first time unit $T_1$. In the second time unit $T_2$, even if the light emission duration of the light emission control signal Emit within each light emission period M changes by 4H, the fluctuation in brightness $$\left(\frac{4H \times 8}{200H \times 8} = 2\%\right)$$

between the second time unit $T_2$ and the first time unit $T_1$ can still be less than 3%. However, for the second brightness level DBV-2, the light emission control signal Emit has a light emission duration of 100H and a non-emission duration of 140H within each light emission period M in the first time unit $T_1$. In the second time unit $T_2$, if the light emission duration of the light emission control signal Emit within each light emission period M is also controlled to change by 4H, the fluctuation in brightness $$\left(\frac{4H \times 8}{100H \times 8} = 4\%\right)$$

between the second time unit $T_2$ and the first time unit $T_1$ will reach 4%, which does not meet the condition of being less than 3%. Therefore, at the second brightness level DBV-2, the light emission control signal Emit can be controlled to have different light emission durations in at least some of the light emission periods M within the second time unit $T_2$ (compared to the first time unit T1). For example, the light emission duration of the light emission control signal Emit can be changed by 4H in the first light emission period M of the fourth hold frame kF and changed by 4H in the first light emission period M of the sixth hold frame kF, while the light emission durations in other light emission periods M remain unchanged, so as to reduce the fluctuation in brightness between the second time unit $T_2$ and the first time unit $$T_1\left(\frac{4H \times 2}{100H \times 8}\right)$$

to 1%.

From the above, it can be seen that for the lower second brightness level DBV-2, by adopting the control method mentioned above, it becomes easier to meet the brightness fluctuation condition.

Furthermore, referring to FIG. 9 again, in the first time unit T1, the light emission control signal Emit has a first light emission duration in odd-numbered light emission periods M and a second light emission duration in even-numbered light emission periods M. The first light emission duration is different from the second light emission duration, which helps to make the timing of the light emission control signal Emit in the first time unit T1 more regular.

For example, in the first time unit T1, the light emission duration of the light emission control signal Emit in the odd-numbered light emission period M can be the same as the light emission duration of the light emission control signal Emit within a single light emission period M in the active frame aF. In other words, this method does not adjust the duty cycle of the light emission control signal Emit in the odd-numbered light emission period M in the first time unit T1, but only adjusts the duty cycle in the even-numbered light emission period M. Alternatively, in the first time unit T1, the light emission durations of the light emission control signal Emit in both the odd-numbered and even-numbered light emission periods M can be different from the light emission duration of the light emission control signal Emit within a single light emission period M in the active frame aF. In other words, this method adjusts the duty cycles of the light emission control signal Emit in both the odd-numbered and even-numbered light emission periods M in the first time unit T1, but with different magnitudes of adjustment.

Under normal circumstances, when the fluctuation in brightness exceeds 3%, it is easily recognizable by the human eye. Therefore, in a feasible implementation, A can be less than or equal to 3%.

Considering that flickering is less noticeable at driving frequencies above 60 Hz, in a feasible implementation, the time unit T can be set to a time equivalent to or greater than one data refresh cycle corresponding to 60 Hz or above, that is, the time unit T is greater than or equal to $\frac{1}{60}$.

Based on the same inventive conception, an embodiment of the present disclosure further provides a display panel that is driven using the foregoing driving method.

Figure 10:
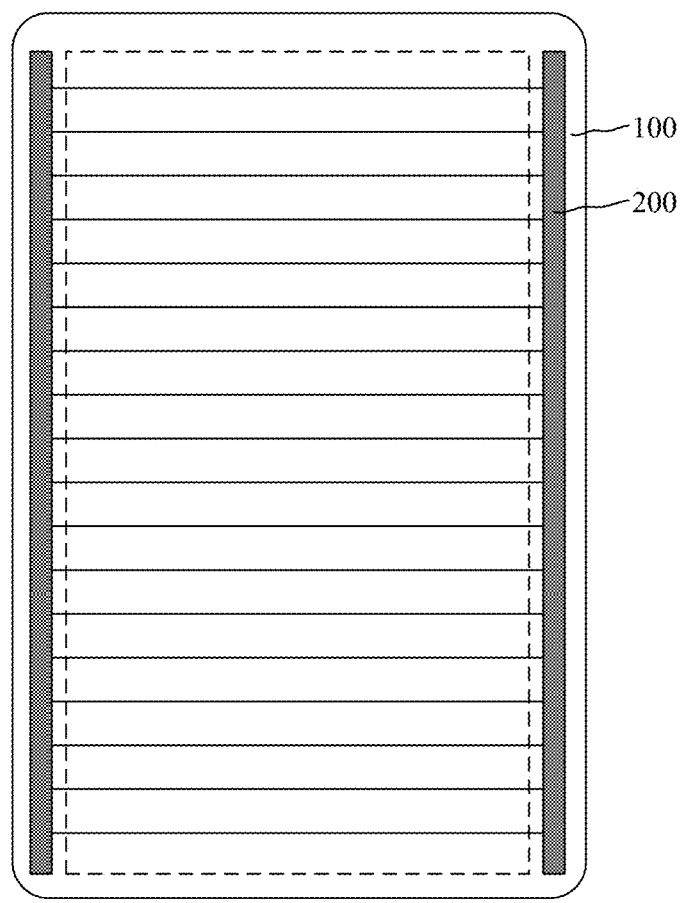
FIG. 10 is a schematic structural diagram of a display apparatus according to an embodiment of the present disclosure.

Based on the same inventive conception, an embodiment of the present disclosure further provides a display apparatus. As shown in FIG. 10, which is a schematic structural diagram of a display apparatus according to an embodiment of the present disclosure, the display apparatus includes the foregoing display panel 100. Additionally, the display apparatus may further include an emission shift register circuit 200 configured to provide a light emission control signal Emit to the display panel 100. The specific adjustment method for the light emission control signal Emit has been described in detail in the foregoing embodiment, and details are not described herein again.

Certainly, the display apparatus shown in FIG. 10 is for schematic description only. The display apparatus may be any electronic device with a display function, such as a mobile phone, a tablet computer, a notebook computer, an ebook, or a television.

The above descriptions are merely preferred examples of the present disclosure, and are not intended to limit the present disclosure. Any modifications, equivalent replacements, improvements, and the like made within the spirit and principle of the present disclosure shall fall within the protection scope of the present disclosure.

Finally, it should be noted that the above embodiments are merely intended to describe the technical solutions of the present disclosure, rather than to limit the present disclosure. Although the present disclosure is described in detail with reference to the above embodiments, persons of ordinary skill in the art should understand that they may still make modifications to the technical solutions described in the above embodiments or make equivalent replacements to some or all technical features thereof, without departing from the essence of the technical solutions in the embodiments of the present disclosure.

What is claimed is:

1. A method for driving a display panel, wherein the display panel has a first mode, and a driving period in the first mode comprises an active frame and a holding frame; and the driving method comprises: in the first mode, controlling a total light emission duration of a light emission control signal in two adjacent time units in the driving period to satisfy a following condition:

$$\left|\frac{N_i - N_{i+1}}{N_i}\right| < A,$$

wherein a time unit comprises at least one light emission period, a first time unit at least partially overlaps the active frame, $N_i$ denotes a total light emission duration of the light emission control signal in an i-th time unit, $N_{i+1}$ denotes a total light emission duration of the light emission control signal in an (i+1)-th time unit, i≥1, and A denotes a critical percentage threshold for brightness variation.

2. The method according to claim 1, wherein the time unit comprises at least two light emission periods.

3. The method according to claim 2, wherein at least one overlapping light emission period is provided between the two adjacent time units.

4. The method according to claim 3, wherein numbers of overlapping light emission periods between any two adjacent time units are equal.

5. The method according to claim 2, wherein the two adjacent time units are continuous but do not overlap with each other.

6. The method according to claim 2, wherein the display panel has a first brightness level and a second brightness level, maximum brightness at the second brightness level is lower than maximum brightness at the first brightness level; and
the time unit at the second brightness level comprises a first time unit, and the light emission control signal has different light emission durations in at least two light emission periods in the first time unit.

7. The method according to claim 6, wherein in the first time unit, the light emission control signal has a first light emission duration in an odd-numbered light emission period and a second light emission duration in an even-numbered light emission period, and
the first light emission duration is different from the second light emission duration.

8. The method according to claim 1, wherein the time unit is an integer multiple of one frame time.

9. The method according to claim 1, wherein the display panel has a first brightness level and a second brightness level, and maximum brightness at the second brightness level is lower than maximum brightness at the first brightness level; and
a value of A corresponding to the second brightness level is greater than a value of A corresponding to the first brightness level.

10. The method according to claim 1, wherein the first mode comprises a first driving mode and a second driving mode, a driving frequency in the second driving mode is lower than a driving frequency in the first driving mode; and
the display panel has a third brightness level, a value of A corresponding to the third brightness level in the second driving mode is less than a value of A corresponding to the third brightness level in the first driving mode.

11. The method according to claim 1, wherein the first mode comprises a first driving mode and a second driving mode, a driving frequency in the second driving mode is lower than a driving frequency in the first driving mode; and
a number of light emission periods in one time unit in the second driving mode is greater than a number of light emission periods in one time unit in the first driving mode.

12. The method according to claim 1, further comprises:
in the first mode, determining whether a current brightness level is greater than a first threshold brightness level and less than a second threshold brightness level, and in a condition that the current brightness level is greater than the first threshold brightness level and less than the second threshold brightness level, controlling the total light emission duration of the light emission control signal within the two adjacent time units in the driving period to satisfy the following condition:

$$\left|\frac{N_i - N_{i+1}}{N_i}\right| < A;$$

wherein maximum brightness at the first threshold brightness level is $$L_{max} \times \left(\frac{32}{255}\right)^\gamma,$$

maximum brightness at the second threshold brightness level is $$L_{max} \times \left(\frac{220}{255}\right)^\gamma,$$

$L_{max}$ denotes maximum brightness at a maximum brightness level of the display panel, and $\gamma$ denotes a gamma value.

13. The method according to claim 1, wherein a number of light emission periods within one time unit is k;
the light emission duration of the light emission control signal within a single light emission period in the active frame is t1, and when a duty cycle of the light emission control signal changes, a minimum variation in the light emission duration of the light emission control signal within the single light emission period is $\Delta t$; and $$\frac{\Delta t}{t1} < A,$$

and k≥1.

14. The method according to claim 1, wherein a number of light emission periods within one time unit is k;
the light emission duration of the light emission control signal within a single light emission period in the active frame is t1, and when a duty cycle of the light emission control signal changes, a minimum variation in the light emission duration of the light emission control signal within the single light emission period is $\Delta t$; and $$\frac{\Delta t}{t1} > A, \text{ and } k > \frac{\Delta t}{A \times t1}.$$

15. The method according to claim 14, wherein $$\frac{\Delta t}{(k-1) \times t1} > A.$$

16. The method according to claim 1, wherein A≤3%.

17. The method according to claim 1, wherein the time unit is greater fan of equal to $$\frac{1}{60} \text{ s.}$$

18. A display panel, driven by a method, wherein
the display panel has a first mode, and a driving period in the first mode comprises an active frame and a holding frame; and
the method comprises: in the first mode, controlling a total light emission duration of a light emission control signal in two adjacent time units in the driving period to satisfy a following condition:

$$\left|\frac{N_i - N_{i+1}}{N_i}\right| < A,$$

wherein a time unit comprises at least one light emission period, a first time unit at least partially overlaps the active frame, $N_i$ denotes a total light emission duration of the light emission control signal in an i-th time unit, $N_{i+1}$ denotes a total light emission duration of the light emission control signal in an (i+1)-th time unit, i≥1, and A denotes a critical percentage threshold for brightness variation.

19. A display apparatus, comprising a display panel, wherein the display panel is driven by a method, wherein
the display panel has a first mode, and a driving period in the first mode comprises an active frame and a holding frame; and
the method comprises: in the first mode, controlling a total light emission duration of a light emission control signal in two adjacent time units in the driving period to satisfy a following condition:

$$\left|\frac{N_i - N_{i+1}}{N_i}\right| < A,$$

wherein a time unit comprises at least one light emission period, a first time unit at least partially overlaps the active frame, $N_i$ denotes a total light emission duration of the light emission control signal in an i-th time unit, $N_{i+1}$ denotes a total light emission duration of the light emission control signal in an (i+1)-th time unit, i≥1, and A denotes a critical percentage threshold for brightness variation.

* * * * *